United States Patent
Ueno et al.

[11] Patent Number: 6,145,063
[45] Date of Patent: Nov. 7, 2000

[54] MEMORY SYSTEM AND INFORMATION PROCESSING SYSTEM

[75] Inventors: Kiyoji Ueno; Nobuyuki Ikumi, both of Tokyo, Japan

[73] Assignee: Kabushiki Kaisha Toshiba, Kawasaki, Japan

[21] Appl. No.: 09/120,730

[22] Filed: Jul. 23, 1998

[30] Foreign Application Priority Data

Jul. 23, 1997 [JP] Japan .................................. 9-197377

[51] Int. Cl.[7] .................................................. G06F 12/00
[52] U.S. Cl. ..................... 711/157; 711/5; 365/230.03; 365/230.04
[58] Field of Search ............................... 711/157, 5, 127, 711/221; 365/230.03, 230.04, 189.07, 231

[56] References Cited

U.S. PATENT DOCUMENTS

| | | | |
|---|---|---|---|
| 5,530,837 | 6/1996 | Williams et al. | 711/157 |
| 5,761,695 | 6/1998 | Maeda et al. | 711/5 |
| 5,761,714 | 6/1998 | Liu et al. | 711/127 |

Primary Examiner—John W. Cabeca
Assistant Examiner—Denise Tran
Attorney, Agent, or Firm—Foley & Lardner

[57] ABSTRACT

In a memory composed of a plurality of banks, even if succeeding access is performed to the same bank as that being currently accessed, the succeeding access can be controlled according to the destination which is currently accessed and its accessed state. In addition, if particular relationships exist between a precedingly accessed destination and the succeedingly accessed destination, a corresponding main word line out of main word lines which correspond to respective rows of respective banks can be still held in its selected state even after the preceding access has been terminated.

15 Claims, 6 Drawing Sheets

MEMORY SYSTEM AND INFORMATION PROCESSING SYSTEM

BACKGROUND OF THE INVENTION

1. Field of the Invention

The present invention relates to a memory system including a circuit for controlling accesses to a bank of memories to which interleaved access is applied and an information processing system into which the memory system is incorporated.

2. Description of the Prior Art

As an information processing speed has been increased according to higher performance of the MPU (Micro Processing Unit) in the information processing system, a higher speed of the memory system has been requested. However, there is a limit to such higher speed of the memory system. Further, if the large number of high speed memory systems should be employed, cost of the overall system is increased because of high cost of the high speed memory system.

Therefore, there has been a memory system which employs such an approach that the memory system is constructed as a multi-bank system in which a plurality of independently accessible memories are installed and the interleaved access to the memory system is performed by accessing respective banks on a time-division base, so that the memory system can be accessed apparently quicker than the access time of the memories constituting respective banks if such memory system is observed externally. For example, the information processing system containing the memory system consisting of multi-bank DRAMs (Dynamic Random Access Memories) will be discussed herein. As shown in a timing chart of the interleaved access of FIG. 1, in the case that a cycle time of the DRAM is about 80 (ns) and a cycle time of the MPU is about 5 (ns), data can be supplied from the memory system constructed as a sixteen-bank system to the MPU every cycle of the MPU by performing the interleaved access to such memory system. As a result, an apparent access time of the DRAM can be reduced.

Under the premise such that individual accesses should be applied to different banks in successive accesses to the memory system respectively and the interleaved access is always carried out, the above-mentioned advantage can be achieved.

However, the accesses to the memory system have not always been performed by using the above addresses, and thus the case has happened where the accesses to the same bank should be performed successively. In such case, non-interleaved access has been inevitably performed and thus succeeding memory accesses have been kept in their waiting states until the cycle time of the preceding memory access has been terminated. As a result, an access efficiency has been lowered or degraded.

As explained above, in the prior art, according to the memory system constructed as the multi-bank system to which interleaved access is applied, the expected advantage can be achieved if the interleaved access to the memory system can be performed. In contrast, if the non-interleaved accesses to the same bank are carried out successively, the memory system has not been able to be utilized to reduce apparently the access time of the memories. Therefore, the memory system in the prior art has had such a disadvantage that the access efficiency is lowered or degraded.

SUMMARY OF THE INVENTION

Therefore, the present invention has been made in light of the above circumstances, and it is an object of the present invention to provide a memory system to which interleaved access can be applied and which is able to improve an access efficiency of non-interleaved access in such memory system, and an information processing system into which the memory system is incorporated.

In order to achieve the above object, there is provided a memory system comprising: a memory consisting of a plurality of banks each of which is made up of a plurality of segments, each of the segments being divided to correspond to a plurality of sub word lines which are provided to one main word line, and being independently accessible respectively, the memory being accessed in an interleaving manner; a status table having at least a same number of entries as the plurality of banks of the memory, accessed destination information such as bank No., row address, segment address in access in the memory indicating an accessed destination and status information indicating access state of the accessed destination being stored in respective entries; and an access queue for receiving an access address of the memory, then extracting accessed destination information from the access address, and then controlling access to the memory based on extracted accessed destination information and information stored in the status table; wherein the access queue compares the accessed destination information with information stored in the status table to decide their coincidence, and if the same bank as that specified by the extracted accessed destination information is stored in the status table and is now being accessed, then refers to access states stored in the status table in correspondence to the accessed destination information contained in the access to the bank and then controls the access to the memory based on the access states and the information of the row address and the segment address of the accessed destination.

In the preferred embodiment of the present invention, the access queue pre-fetches a plurality of access addresses of the memory, then compares the accesses specified by pre-fetched access addresses with preceding accesses by which the memory is caused just to be shifted into a precharge cycle, and then holds the main word line in its selected state even after the preceding accesses have been terminated if any access to the same bank and the same row address has been found.

In the preferred embodiment of the present invention, if the access to the same bank as that to be accessed by received access address has already been performed and also it has been found from referred status information that, according to such access to the same bank, the main word line in correspondence to the row of the memory is now going to be brought into its selected state but such selection state has not been latched yet in the latch circuit, the access queue controls to bring the access specified by the received access address into its waiting state regardless of the row address and the segment address.

In the preferred embodiment of the present invention, if the access to the same bank as that to be accessed by received access address has already been performed and also it has been found from referred status information that, according to such access to the same bank, the main word line in correspondence to the row of the memory has been brought into its selected state, then such selection state has been latched in the latch circuit, then the sub word line corresponding to the segment of the memory has been selected, and then stored data are now going to be read from a corresponding memory cell, the access queue controls to compare the segment address contained in the received access address with the segment address contained in the access which has already been performed, and then bring the access specified by the received access address into its waiting state if both segment addresses coincide with each other, otherwise perform the access to the memory based on the segment address contained in the received access address regardless of the row address unless both segment addresses coincide with each other.

In the preferred embodiment of the present invention, if the access to the same bank as that to be accessed by received access address has already been performed and also it has been found from referred status information that, according to such access to the same bank, stored data read from a corresponding memory cell are latched by a sense amplifier, the access queue controls to compare the row address and the segment address contained in the received access address with the row address and the segment address contained in the access which has already been performed, and then perform the access to the memory based on the segment address contained in the received access address regardless of the row address unless both segment addresses coincide with each other, otherwise perform the access to the memory based on the row address contained in the received access address if both row addresses do not coincide with each other but both segment addresses coincide with each other.

In the preferred embodiment of the present invention, the memory, the status table, and the access queue are constructed as one chip.

In the preferred embodiment of the present invention, the memory, the status table, and the access queue are constructed as discrete chips respectively.

In the preferred embodiment of the present invention, the status table and the access queue are constructed as one chip.

In order to achieve the above object, there is provided an information processing system comprising: a memory system set forth in claim 1; and a microprocessor for supplying the access address to the memory system.

In order to achieve the above object, there is provided an information processing system comprising: a memory system set forth in claim 2; and a microprocessor for supplying the access address to the memory system.

In order to achieve the above object, there is provided an information processing system comprising: a memory system set forth in claim 6; and a microprocessor for supplying the access address to the memory system.

In order to achieve the above object, there is provided an information processing system comprising: a memory system set forth in claim 7; and a microprocessor for supplying the access address to the memory system.

In order to achieve the above object, there is provided an information processing system comprising: a memory system set forth in claim 8; and a microprocessor for supplying the access address to the memory system.

In the preferred embodiment of the present invention, the memory system and the microprocessor are constructed as one chip.

In the preferred embodiment of the present invention, the status table, the access queue, and the microprocessor are constructed as one chip.

The nature, principle and utility of the invention will become more apparent from the following detailed description when read in conjunction with the accompanying drawings.

DESCRIPTION OF THE PREFERRED EMBODIMENTS

Embodiments of the present invention will be explained with reference to the accompanying drawings hereinafter.

Figure 1:
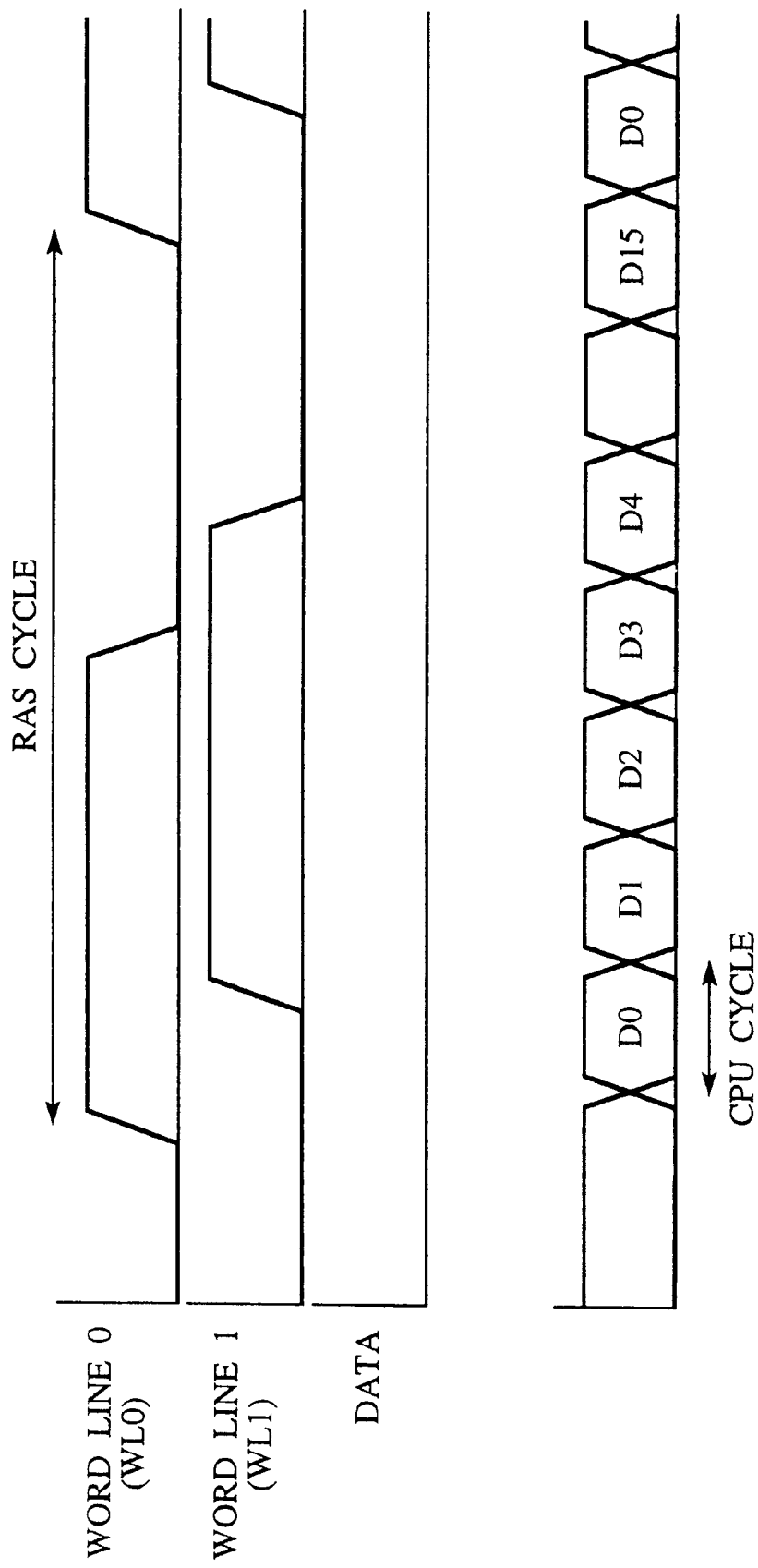
FIG. 1 is a timing chart showing timings of interleaved accesses in a bank of memories.
Figure 2:
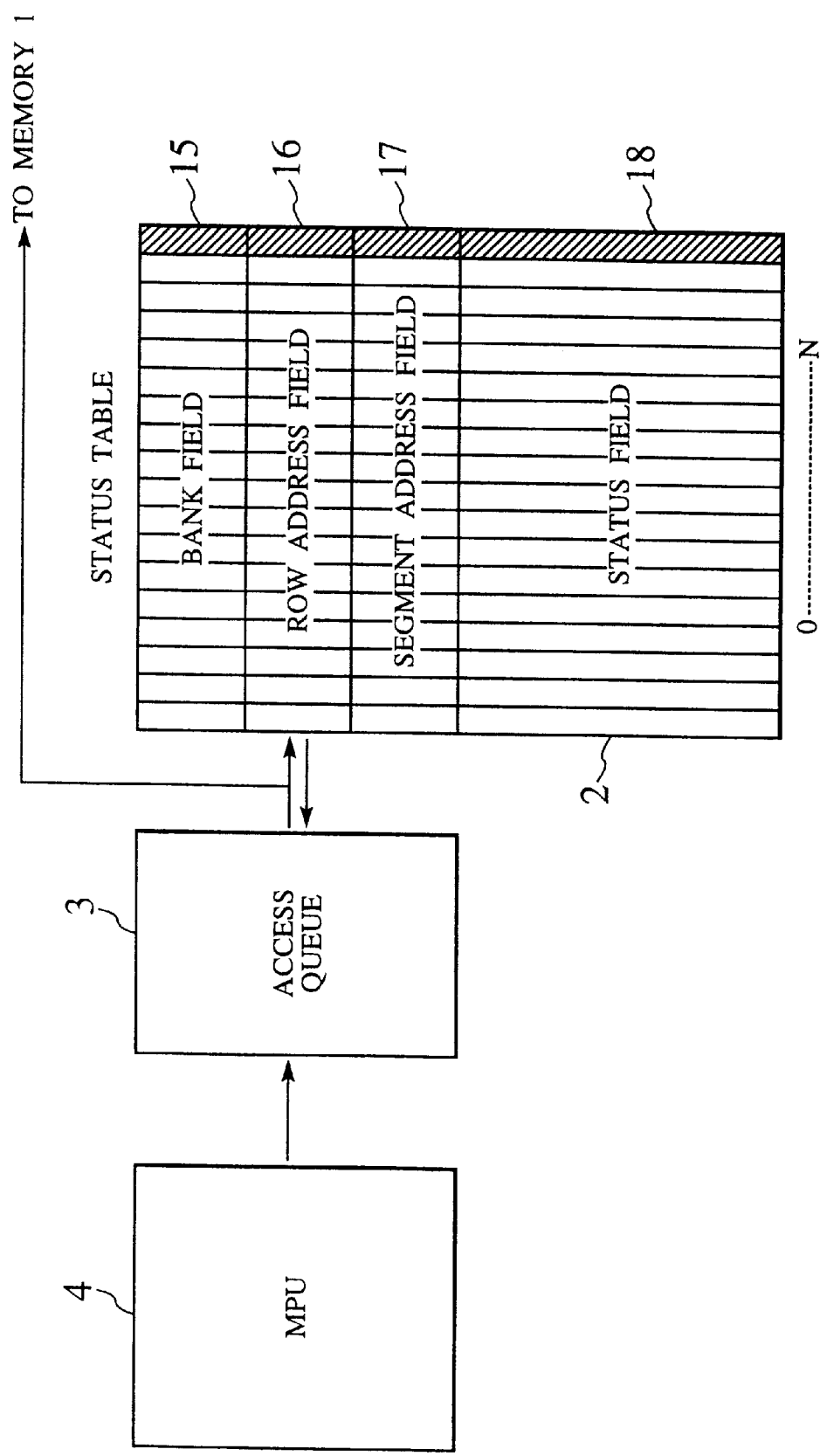
FIG. 2 is a schematic block diagram showing configurations of a memory system and an information processing system according to embodiments of the present invention.
Figure 3:
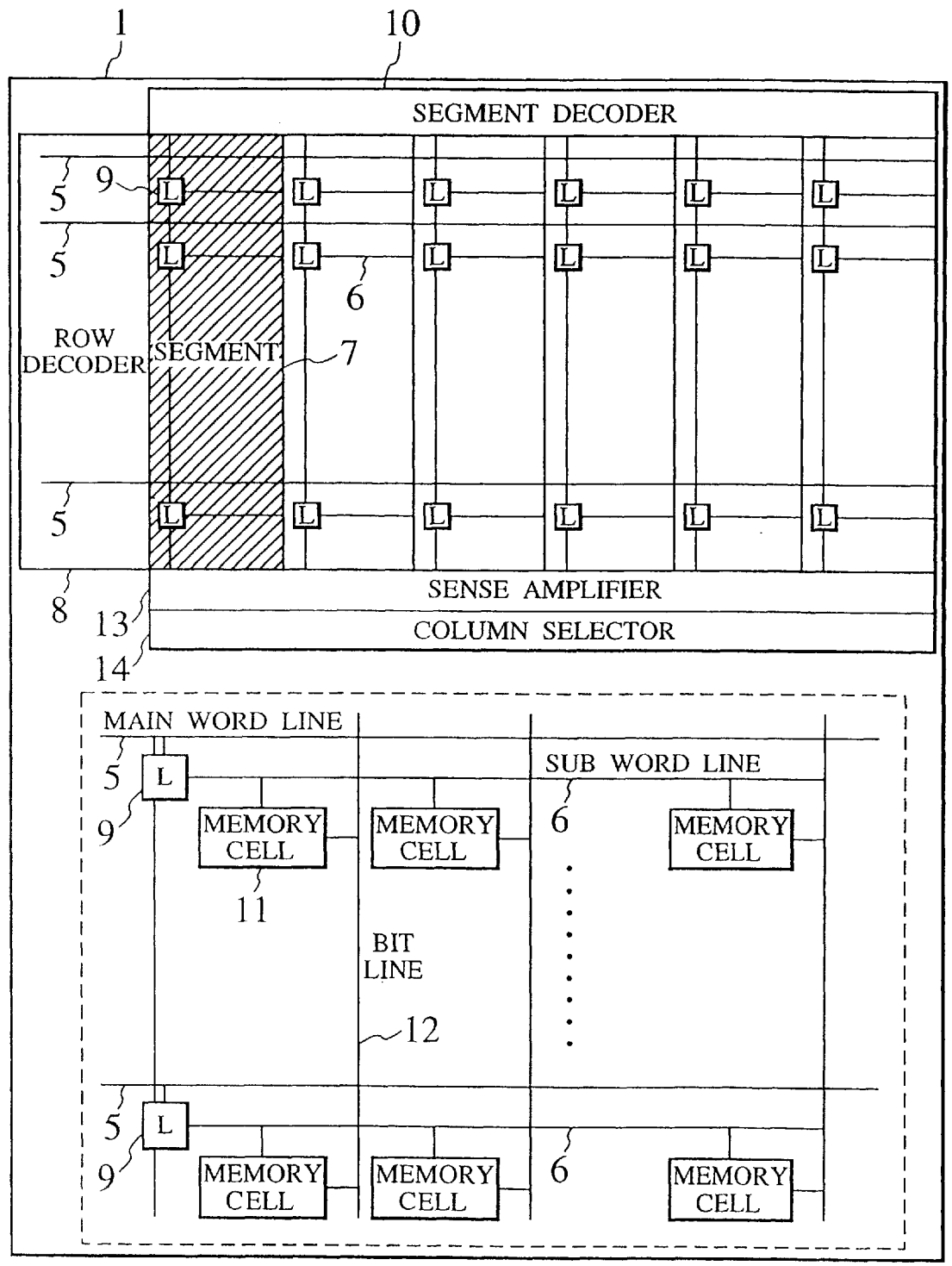
FIG. 3 is a schematic block diagram showing a configuration of a memory in the memory system according to the embodiment of the present invention.

FIGS. 2 and 3 is a schematic view showing a configuration of a memory system according to an embodiment of the present invention and a configuration of an information processing system according to an embodiment of the present invention.

The memory system according to the embodiment comprises a memory 1 composed of a DRAM (Dynamic Random Access Memory) shown in FIG. 3, and a status table 2 and an access queue 3 both shown in FIG. 2. The information processing system comprises an MPU (Micro Processing Unit) 4 in addition to the memory system.

In FIG. 3, the memory 1 consists of a plurality of banks. Each of banks is made up of a plurality of segments 7 which are divided to correspond to a plurality of sub word lines 6 which are provided to one main word line 5. The segments 7 are independently accessible respectively. The banks can be accessed in an interleaving manner respectively. Based on the decoded result of the row address by a row decoder 8, each of the main word lines 5 can be selected alternatively. A plurality of latch circuits 9 are connected to each of the main word lines 5 to coincide with a plurality of segments 7 respectively. Each of the latch circuits 9 can latch the selection state of the corresponding main word line 5. The sub word lines 6 corresponding to the respective segments 7 are connected to the latch circuits 9 respectively. Each of the sub word lines 6 can be selected under the situation that the corresponding latch circuit 9 is holding the state indicating that the main word line 5 is selected and also such latch circuit 9 is specified by the decoded result of the segment address by means of a segment decoder 10. A plurality of memory cells 11 are connected to respective sub word lines 6 in a matrix fashion. Stored information read from a memory cell 11 to a corresponding bit line 12 can be amplified by a sense amplifier 13 and then selected by a column selector 14 to be read out.

Referring back to FIG. 2, the status table 2 is composed of a FIFO, shift registers, etc., for example, and has at least the same number (e.g., N) of entries as the banks in the memory 1. Accessed destination information indicating an accessed destination, e.g., bank No., row address, segment address in the access to the memory 1 and status information indicating access states of the accessed destination are stored in respective entries of the status table 2. Then, such stored information are shifted in the status table 2 in the order of entry in synchronous with a cycle time of the MPU 4 to access the memory 1. Then, such stored information are deleted from the status table 2 after the access to the memory 1 has been terminated. A bank field 15, a row address field 16, and a segment address field 17 are composed of a content addressed memory (CAM), etc. formed as a multi-port system respectively. The accessed destination information, e.g., bank No., row address, segment address of respective entries are stored into the bank field 15, the row address field 16, and the segment address field 17 respectively. Therefore, the bank field 15, the row address field 16, and the segment address field 17 can access the access queue 3, and conversely the access queue 3 can access respective entries of the status table 2.

Figure 4:
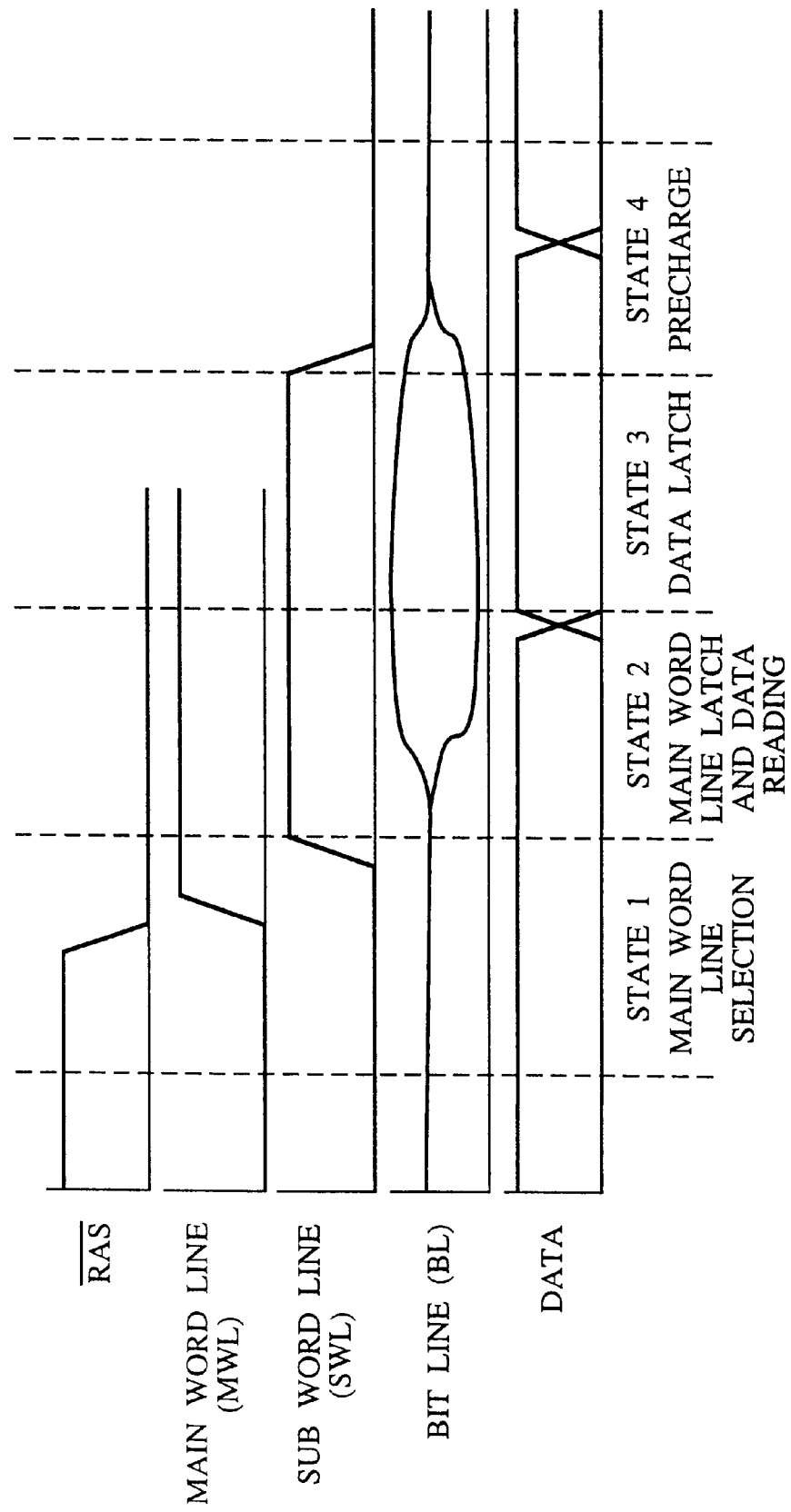
FIG. 4 is a timing chart showing respective states of status information in access cycle of the memory.

The status information indicating the access states of the accessed destination are stored in status fields 18 of respective entries in the status table 2. As shown in FIG. 4, there are four access states as the access states of the memory 1. More particularly, the main word line 5 is going to be shifted in its selected state but such selection state has not been latched by the latch circuit 9 (state 1); after the main word line 5 has been selected, then its selection state has been latched by the latch circuit 9 and then the sub word line 6 has been selected, stored data are now going to be read from the memory cell 11 (state 2); stored data being read out are just latched by the sense amplifier 13 (state 3); and after reading out of the stored data has been terminated and then the sub word line 6 has been brought into its non-selected state, precharge is started (state 4). For example, in case respective states of the status information can be expressed by integral multiple of the cycle time of the MPU 4, the status field 18 of the status table 2 may be composed of counters which can be operated in synchronous with the cycle time of the MPU 4. Thus, respective states of the memory 1 can be represented by values of the counters. On the contrary, in case respective states of the status information cannot be expressed by integral multiple of the cycle time of the MPU 4, respective states may be decided and stored based on control signals to the memory 1 to control respective states.

The access queue 3 can receive the access address of the memory 1 supplied from the MPU 4, then extract the accessed destination information such as the bank No., the row address, the segment address from the access address, then transform the extracted accessed destination information into an entry format for the status table 2 and also refer to the status table 2 based on the extracted accessed destination information in parallel with such transformation, and then control the access to the memory 1 based on the reference result to thus carry out the interleaved access to the memory 1.

In the access to the status table 2 based on the access queue 3, accessed destination information such as the bank No., the row address, the segment address extracted from the access address of the memory 1 are compared with accessed destination information stored in the status table 2 so as to decide their coincidence. According to the decision result, if it has been found that the access to the same bank as that extracted from the access address of the memory 1 is not performed from another entry, such accessed address can be supplied to the memory 1 to perform the access to the memory 1, and then an entry of the accessed destination information being transformed into the entry format can be conducted in the status table 2.

In contrast, if the access to the same bank has been performed, the row address, the segment address, and the status information stored in the status table 2 in correspondence to the bank which is in access are referred to, and then access control of the memory 1 is carried out based on these information and the row address and the segment address which are extracted from the access address of the memory 1.

More specifically, in case the access to the same bank as that designated by the access address of the memory 1 has been performed and also it has been found according to the referred status information that the memory 1 is in its state 1 shown in FIG. 4, the access can be brought into its waiting state regardless of the row address and the segment address, so that the access to the memory 1 cannot be performed. Further, an entry of data such as dummy, invalid, or the like, which have no influence upon the operation, can be performed from the access queue 3 to the status table 2 every cycle of the MPU 4 which is kept in its waiting state such that the access to the status table 2 based on the access queue 3 does not cause an unnecessary operation.

Then, in case it has been found according to the referred status information that the memory 1 is in its state 2 shown in FIG. 4, when both segment addresses do not coincide with each other in the decision result of comparison between the segment address contained in the access address of the memory 1 and the segment address stored in the status table 2, the access to the memory 1 cannot be carried out. Thus, like the state 1, data which have no influence upon the operation can be entered from the access queue 3 to the status table 2. In contrast, when both segment addresses do not coincides with each other, the memory 1 can be accessed based on the access address of the memory 1 regardless of the row address since the sub word line 6 has been specified. As a result, the segment different from the segment which has been stored in the status table 2 and is now being accessed can be accessed.

Next, in case it has been found according to the referred status information that the memory 1 is in its state 3 shown in FIG. 4, the access to the memory 1 can be carried out in the same manner as the case in the above state 2 when both segment addresses do not coincide with each other in the decision result of comparison between the row address and the segment address contained in the access address of the memory 1 and the row address and the segment address stored in the status table 2. In contrast, when both row addresses do not coincide with each other but both segment addresses coincides with each other, the memory 1 can be accessed based on the access address of the memory 1 since read data have been latched. As a result, the access to the row address different from the row address which has been stored in the status table 2 and is being currently accessed can be performed.

In the end, in case it has been found according to the referred status information that the memory 1 is in its state 4 shown in FIG. 4, all the accesses can be received since the reading out of the stored data have been terminated.

In this way, even though it has become clear according to the status information in the status table 2 that the bank of the memory 1 to be accessed is now being accessed, sometimes the access can be performed according to the access states of the memory 1 and the row address and the segment address. Hence, the access with much more high random attribute rather than the prior art can be performed and thus throughput of the data access can be improved. In addition, since throughput of the data access can be improved, throughput of information processing in the information processing system can also be improved.

Also, the access queue 3 can pre-fetch a plurality of access addresses of the memory 1 which are output from the MPU 4, and then compare the accessed destination information in the entries whose status information show the state 3 with the accessed destination information of the accesses which have been pre-fetched. Then, if there can be found accesses to the same bank and the same row address between the accesses which have been entered in the status table 2 and now being currently accessed and the accesses whose access addresses have been pre-fetched, the access queue 3 can control the memory 1 so as to hold the main word line 5 in its selected state even after the access which is currently accessed and has the same bank and the same row address has been terminated. Accordingly, a time and a consumption power to shift the main word line 5 from its non-selected state to its selected state can be reduced.

Figure 5:
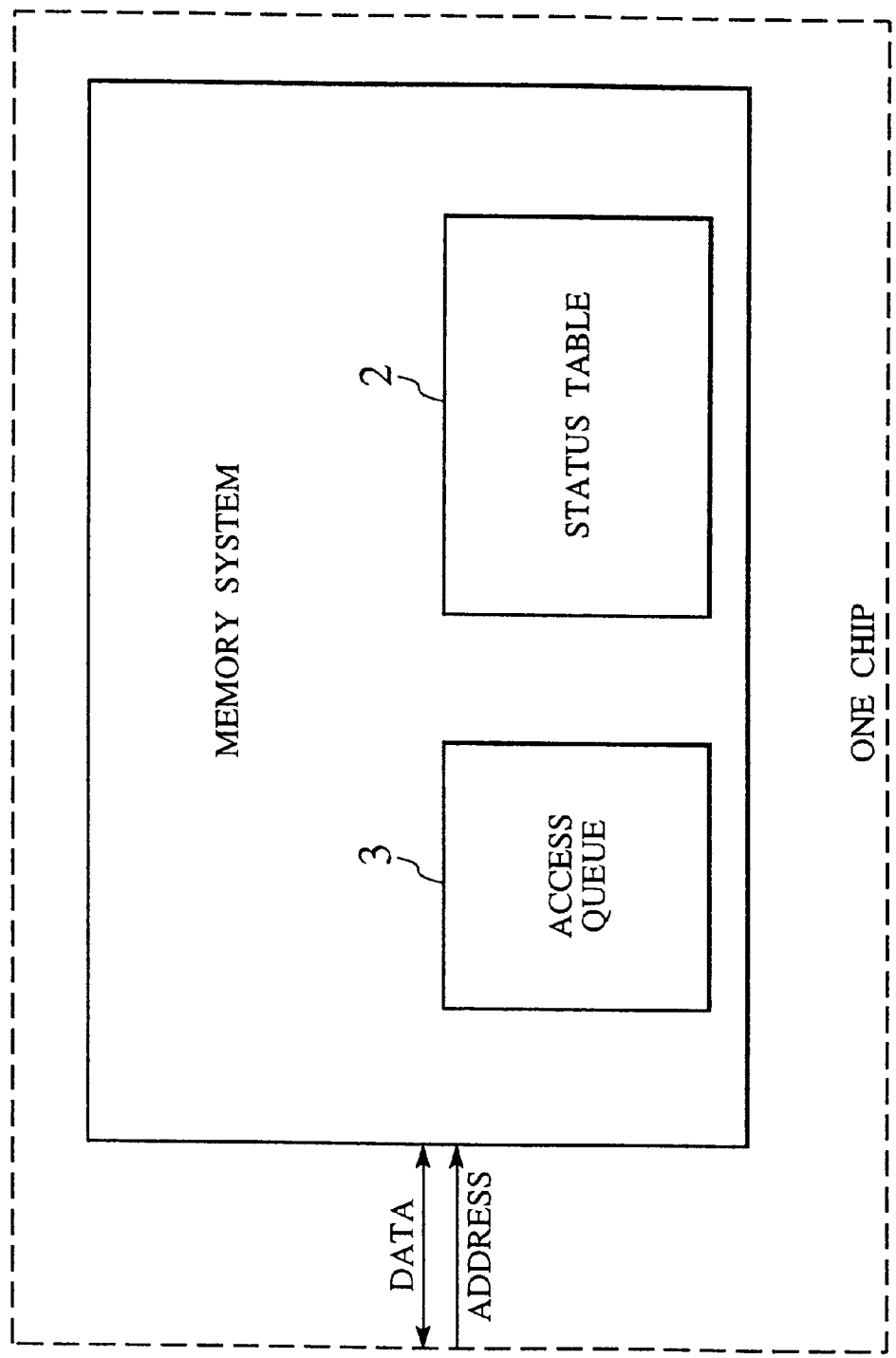
FIG. 5 is a schematic block diagram showing a configuration of a memory system according to another embodiment of the present invention.

FIG. 5 is a schematic block diagram showing a configuration of a memory system according to another embodiment of the present invention. A feature of this another embodiment resides in that the memory 1 as the DRAM main body shown in FIG. 3 and the status table 2 and the access queue 3 both shown in FIG. 2 are incorporated into one chip. In such another embodiment, the memory system can be installed readily into various systems.

Figure 6:
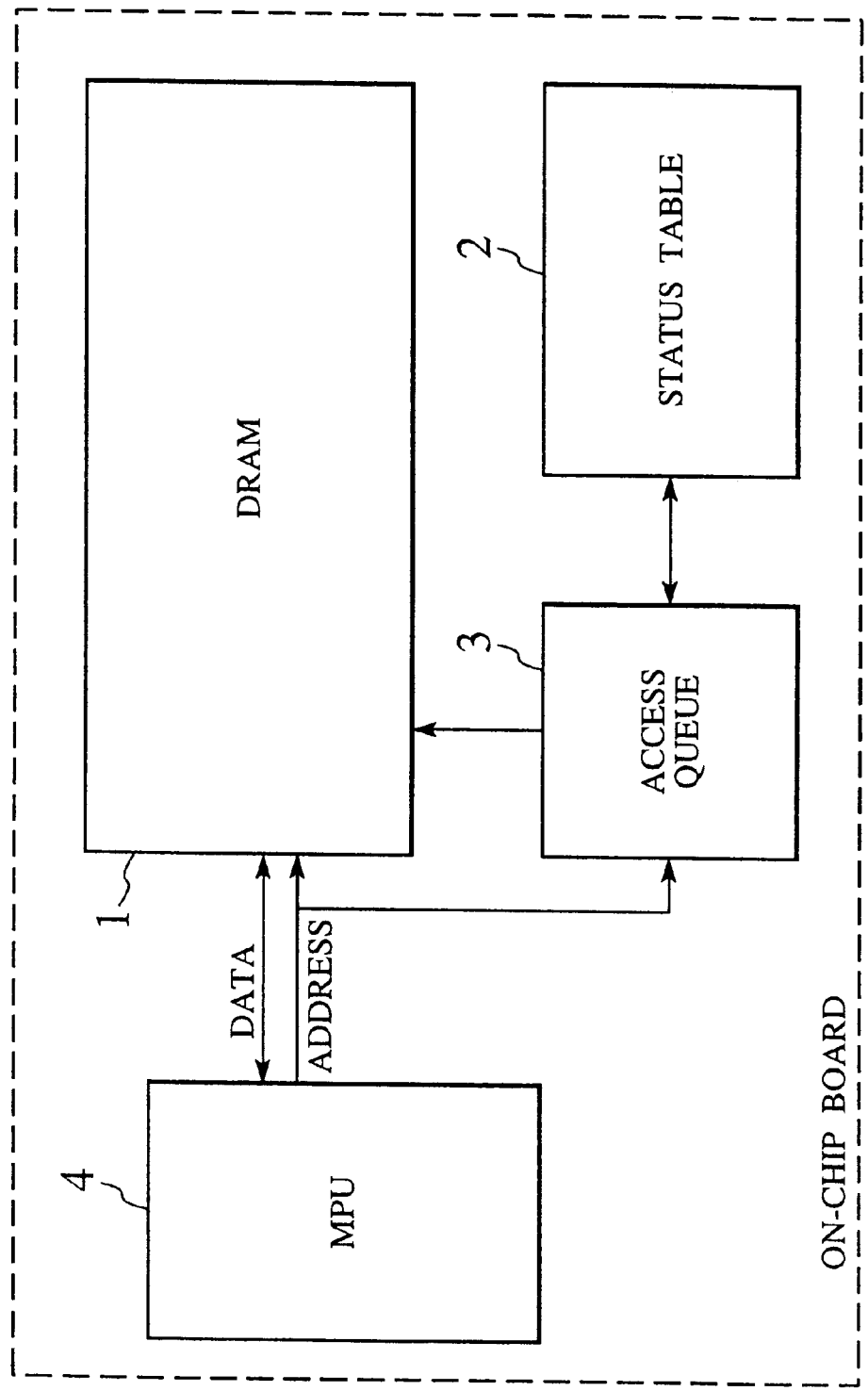
FIG. 6 is a schematic block diagram showing a configuration of an information processing system according to another embodiment of the present invention.

FIG. 6 is a schematic block diagram showing a configuration of an information processing system according to another embodiment of the present invention.

A feature of this embodiment resides in that the information processing system can be constructed by incorporating the memory 1 as the DRAM main body shown in FIG. 3 and the status table 2, the access queue 3 and the MPU 4 all shown in FIG. 2 into one chip, otherwise the information processing system can be constructed by incorporating the memory 1 and the status table 2, and the access queue 3 and the MPU 4 into individual chips on one board respectively. Furthermore, the status table 2 and the access queue 3 may be incorporated into one chip, or else the status table 2 and the access queue 3 together with the MPU 4 may be incorporated into one chip. The information processing system can be applied to various application systems by constructing the information processing system in this way.

As explained above, according to the present invention, the succeeding accesses can be controlled according to the accessed destination and the access state now in access even if such succeeding accesses are made to the same bank, and therefore the access with higher random attribute can be achieved. In addition, if there exist particular relationships between the preceding accessed destination and the succeeding accessed destination, the memory system can be controlled so as to hold the main word line still in its selected state after the preceding accesses have been terminated. Accordingly, the time and the consumption power to shift the main word line from its non-selected state to its selected state can be reduced.

It should be understood that many modifications and adaptations of the invention will become apparent to those skilled in the art and it is intended to encompass such obvious modifications and changes in the scope of the claims appended hereto.

What is claimed is:

1. A memory system comprising:
   a memory consisting of a plurality of banks each of which is made up of a plurality of segments, each of the segments being divided to correspond to a plurality of sub word lines which are provided to one main word line, and being independently accessible respectively, the memory being accessed in an interleaving manner;

a status table having at least a same number of entries as the plurality of banks of the memory, accessed destination information such as comprising: bank Number, row address, segment address in access in the memory indicating an accessed destination and status information indicating access state of the accessed destination being stored in respective entries; and an access queue for receiving an access address of the memory, then extracting accessed destination information from the access address, and then controlling access to the memory based on extracted accessed destination information and information stored in the status table;

wherein the access queue compares the accessed destination information with information stored in the status table to decide their coincidence, and if the same bank as that specified by the extracted accessed destination information is stored in the status table and is now being accessed, then refers to access states stored in the status table in correspondence to the accessed destination information contained in the access to the bank and then controls the access to the memory based on the access states and the information of the row address and the segment address of the accessed destination.

2. A memory system set forth in claim 1, wherein the access queue pre-fetches a plurality of access addresses of the memory, then compares the accesses specified by prefetched access addresses with preceding accesses by which the memory is caused just to be shifted into a precharge cycle, and then holds the main word line in its selected state even after the preceding accesses have been terminated if any access to the same bank and the same row address has been found.

3. A memory system set forth in claim 1, wherein, if the access to the same bank as that to be accessed by received access address has already been performed and also it has been found from referred status information that, according to such access to the same bank, the main word line in correspondence to the row of the memory is now going to be brought into its selected state but such selection state has not been latched yet in the latch circuit, the access queue controls to bring the access specified by the received access address into its waiting state regardless of the row address and the segment address.

4. A memory system set forth in claim 1, wherein, if the access to the same bank as that to be accessed by received access address has already been performed and also it has been found from referred status information that, according to such access to the same bank, the main word line in correspondence to the row of the memory has been brought into its selected state, then such selection state has been latched in the latch circuit, then the sub word line corresponding to the segment of the memory has been selected, and then stored data are now going to be read from a corresponding memory cell, the access queue controls to compare the segment address contained in the received access address with the segment address contained in the access which has already been performed, and then bring the access specified by the received access address into its waiting state if both segment addresses coincide with each other, otherwise perform the access to the memory based on the segment address contained in the received access address regardless of the row address unless both segment addresses coincide with each other.

5. A memory system set forth in claim 1, wherein, if the access to the same bank as that to be accessed by received access address has already been performed and also it has been found from referred status information that, according to such access to the same bank, stored data read from a corresponding memory cell are latched by a sense amplifier, the access queue controls to compare the row address and the segment address contained in the received access address with the row address and the segment address contained in the access which has already been performed, and then perform the access to the memory based on the segment address contained in the received access address regardless of the row address unless both segment addresses coincide with each other, otherwise perform the access to the memory based on the row address contained in the received access address if both row addresses do not coincide with each other but both segment addresses coincide with each other.

6. A memory system set forth in claim 1, wherein the memory, the status table, and the access queue are constructed as one chip.

7. A memory system set forth in claim 1, wherein the memory, the status table, and the access queue are constructed as discrete chips respectively.

8. A memory system set forth in claim 1, wherein the status table and the access queue are constructed as one chip.

9. An information processing system comprising:
a memory system set forth in claim 1; and
a microprocessor for supplying the access address to the memory system.

10. An information processing system comprising:
a memory system set forth in claim 2; and
a microprocessor for supplying the access address to the memory system.

11. An information processing system comprising:
a memory system set forth in claim 6; and
a microprocessor for supplying the access address to the memory system.

12. An information processing system comprising:
a memory system set forth in claim 7; and
a microprocessor for supplying the access address to the memory system.

13. An information processing system comprising:
a memory system set forth in claim 8; and
a microprocessor for supplying the access address to the memory system.

14. An information processing system set forth in claim 9, wherein the memory system and the microprocessor are constructed as one chip.

15. An information processing system set forth in claim 9, wherein the status table, the access queue, and the microprocessor are constructed as one chip.

* * * * *